United States Patent
Nicholson et al.

(10) Patent No.: US 12,184,964 B2
(45) Date of Patent: Dec. 31, 2024

(54) GESTURE CONTROL DURING VIDEO CAPTURE

(71) Applicant: Lenovo (Singapore) Pte. Ltd., Singapore (SG)

(72) Inventors: John W Nicholson, Rougemont, NC (US); Robert James Norton, Jr., Rougemont, NC (US); Justin Ringuette, Morrisville, NC (US); Sandy Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/947,809

(22) Filed: Sep. 19, 2022

(65) Prior Publication Data

US 2024/0098359 A1   Mar. 21, 2024

(51) Int. Cl.
*H04N 23/611* (2023.01)
*G06F 3/01* (2006.01)
*G06T 7/70* (2017.01)
*H04N 5/262* (2006.01)
*H04N 23/698* (2023.01)

(52) U.S. Cl.
CPC ........... *H04N 23/611* (2023.01); *G06F 3/017* (2013.01); *G06T 7/70* (2017.01); *H04N 5/2628* (2013.01); *H04N 23/698* (2023.01); *G06T 2207/20132* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 8,942,428 B2 * | 1/2015 | Snook | G06V 40/23 382/106 |
| 9,916,009 B2 * | 3/2018 | Zagorsek | G06F 3/017 |
| 11,112,875 B1 * | 9/2021 | Zhou | G06F 3/017 |
| 2014/0320408 A1 * | 10/2014 | Zagorsek | G06F 3/017 345/158 |
| 2015/0009119 A1 * | 1/2015 | Zuccarino | G06F 3/0304 345/156 |
| 2017/0177073 A1 * | 6/2017 | Mason | G06F 3/017 |
| 2022/0159174 A1 * | 5/2022 | Yakishyn | G06F 3/013 |
| 2022/0214743 A1 * | 7/2022 | Dascola | G06F 3/017 |
| 2022/0291755 A1 * | 9/2022 | Lu | G06F 3/017 |
| 2023/0074380 A1 * | 3/2023 | Kim | G06F 3/04842 |
| 2023/0214025 A1 * | 7/2023 | Lessman | G06F 3/011 345/156 |
| 2023/0222744 A1 * | 7/2023 | Uhm | G06F 3/011 345/633 |

* cited by examiner

*Primary Examiner* — Talha M Nawaz
(74) *Attorney, Agent, or Firm* — FERENCE & ASSOCIATES LLC

(57) ABSTRACT

One embodiment provides a method, the method including: capturing, utilizing at least one image capture device coupled to an information handling device, video image data of a user; identifying, utilizing a gesture detection system and within the video image data, a location of hands of the user in relation to a gesture zone; and performing, utilizing the gesture detection system and based upon the location of the hands of the user in relation to the gesture zone, an action, wherein the producing the framed video stream comprises performing an action based upon the location of the hands of the user in relation to the gesture zone. Other aspects are claimed and described.

14 Claims, 4 Drawing Sheets

GESTURE CONTROL DURING VIDEO CAPTURE

BACKGROUND

As a person verbally provides information to a listener and/or an audience, hand gestures are commonly provided by the user either on purpose or subconsciously. The amount of hand gestures provided can be different between presenters; however, the likelihood of some level of hand movements being provided from a presenter to those that are listening is high. Some presenters may use very few hand movements, while other presenters may use many hand movements. When generating video, these hand movements may be captured and transmitted to a viewer so that the viewer can get the full effect of the presentation or communication from the presenter.

BRIEF SUMMARY

In summary, one aspect provides a method, the method including: capturing, utilizing at least one image capture device coupled to an information handling device, video image data of a user; identifying, utilizing a gesture detection system and within the video image data, a location of hands of the user in relation to a gesture zone; and performing, utilizing the gesture detection system and based upon the location of the hands of the user in relation to the gesture zone, an action, wherein the producing the framed video stream comprises performing an action based upon the location of the hands of the user in relation to the gesture zone.

Another aspect provides a system, the system including: at least one image capture device; a processor operatively coupled to the at least one image capture device; a memory device that stores instructions that when executed by the processor, causes the system to: capture, utilizing the at least one image capture device, video image data of a user; identify, utilizing a gesture detection system and within the video image data, a location of hands of the user in relation to a gesture zone; and perform, utilizing the gesture detection system and based upon the location of the hands of the user in relation to the gesture zone, an action, wherein the producing the framed video stream comprises performing an action based upon the location of the hands of the user in relation to the gesture zone.

A further aspect provides a product, the product including: a computer-readable storage device that stores executable code that, when executed by a processor, causes the product to: capture, utilizing at least one sensor, video image data of a user; identify, utilizing a gesture detection system and within the video image data, a location of hands of the user in relation to a gesture zone; and perform, utilizing the gesture detection system and based upon the location of the hands of the user in relation to the gesture zone, an action, wherein the producing the framed video stream comprises performing an action based upon the location of the hands of the user in relation to the gesture zone.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
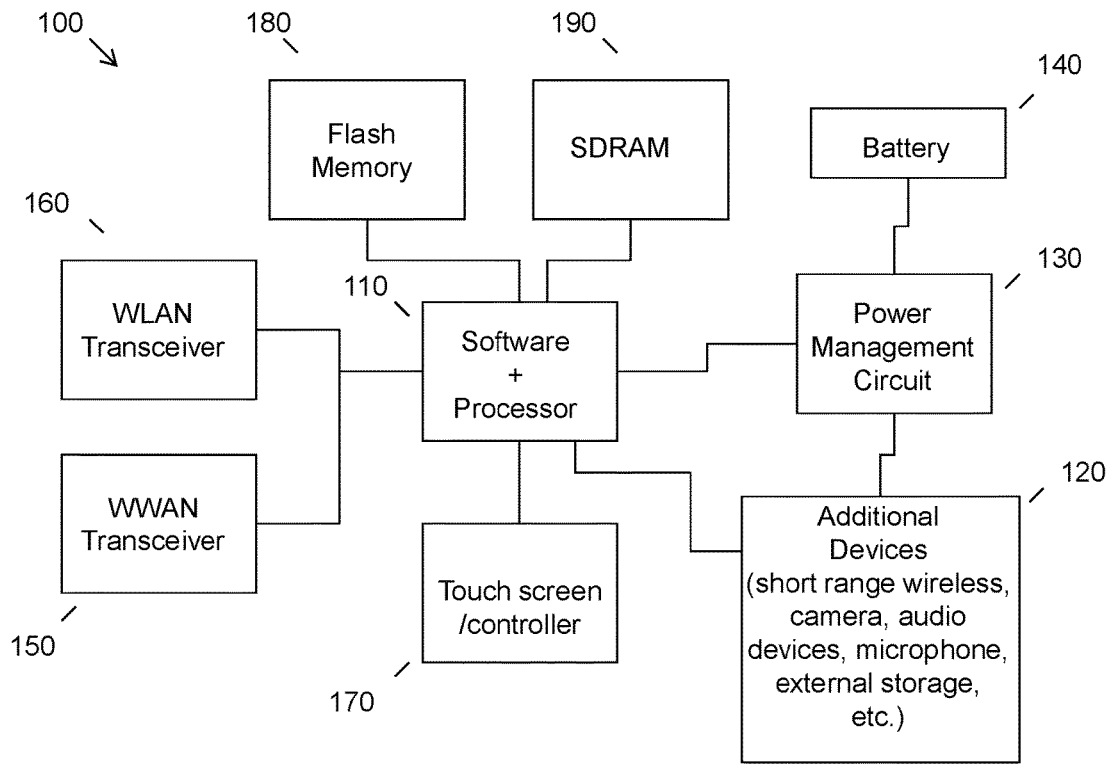
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Video is an exceedingly common way for presenting information. Utilizing video allows presenters to present information to an audience that may be located in different physical locations. Additionally, the use of video allows presenters to record a presentation and then provide the video for users to access at different times, for example, by posting the video on the Internet for others to access. In addition to video, the use of gestures to control functions of computing systems is also of great potential value. Gesture control is particularly convenient when capturing video because the user may be further from the mechanical input devices that may otherwise allow access to the desired function. However, when attempting to control functions using gestures while recording video can result in the gestures being captured on the video and presented to the users accessing or viewing the video. This may result in a presentation that does not have a natural appearance or has gestures that result in those viewing the video getting distracted by the gestures. Additionally, for those systems that can detect and act on gestures, when a user is talking the user may perform natural hand motions that may be interpreted by the system as a controlling gesture and thereby cause a change in function that was not intended by the user.

Existing methods for capturing gestures while capturing video include the implementation of motion-sensing hardware. The motion-sensing hardware may be an accelerometer-based control where the user wears hardware components that sense when the user performs a motion. This hardware allows the user to keep their hands out of the view of the video so that the gestures are not captured. However, motion-sensing hardware has its drawbacks. One issue with motion-sensing hardware is the cost of the components needed. Another issue is that the hardware is generally limited to specific extremities, for example, hands, arms, and fingers, thereby limiting the gesture controls that can be utilized to those gestures performed using these extremities. Additionally, due to the specific extremities that need to be utilized, this means that the user no longer can utilize these extremities for other tasks, such as running a mouse, pointer, drawing, handwriting, and/or the like. Thus, what is needed is a system and method that allows the presenter to perform gestures to control different functions of the systems without transmitting or capturing these gestures on the video that is generated.

Accordingly, the described system and method provides a technique for identifying a location of hands of a user in relation to a gesture zone and then framing a video of the user based on the location of the user's hands by use of a gesture detection system. Utilizing at least one sensor coupled to an information handling device, the system may capture video image data of user. This video image data may then be analyzed by the gesture detection system, where the system will identify the location of the hands of the user in relation to a gesture zone. In the system, the gesture zone may be predetermined by a user, a default zone, and/or the like. Additionally, or alternatively, the gesture zone may be established via a cross section of a two-camera system establishes a blind spot between a primary camera and secondary camera.

The system may utilize one or more cameras to identify when the user's hands are present within the gesture zone. After determining a location of the gesture zone and identifying the location of the user's hands in relation to the zone, the gesture detection system may produce or act upon a gesture recognized by the system and provided within the gesture zone. Additionally, the system may frame the video such that the hands of the user and, therefore, the gesture being performed by the user, is excluded from the video that is produced. Thus, instead of requiring additional components as with traditional techniques, the described system is able to dynamically produce a video of the user that excludes gestures performed by the user, particularly when those gestures are gestures used for the control of different functions of the system, and also perform the function corresponding to the provided gesture. This allows the presenter to not only create video, but also control functions of the system utilizing gestures without including those gestures in the produced video. Additionally, the presenter is free to utilize their hands for other tasks unlike traditional techniques requiring the wearing of motion-sensing components.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
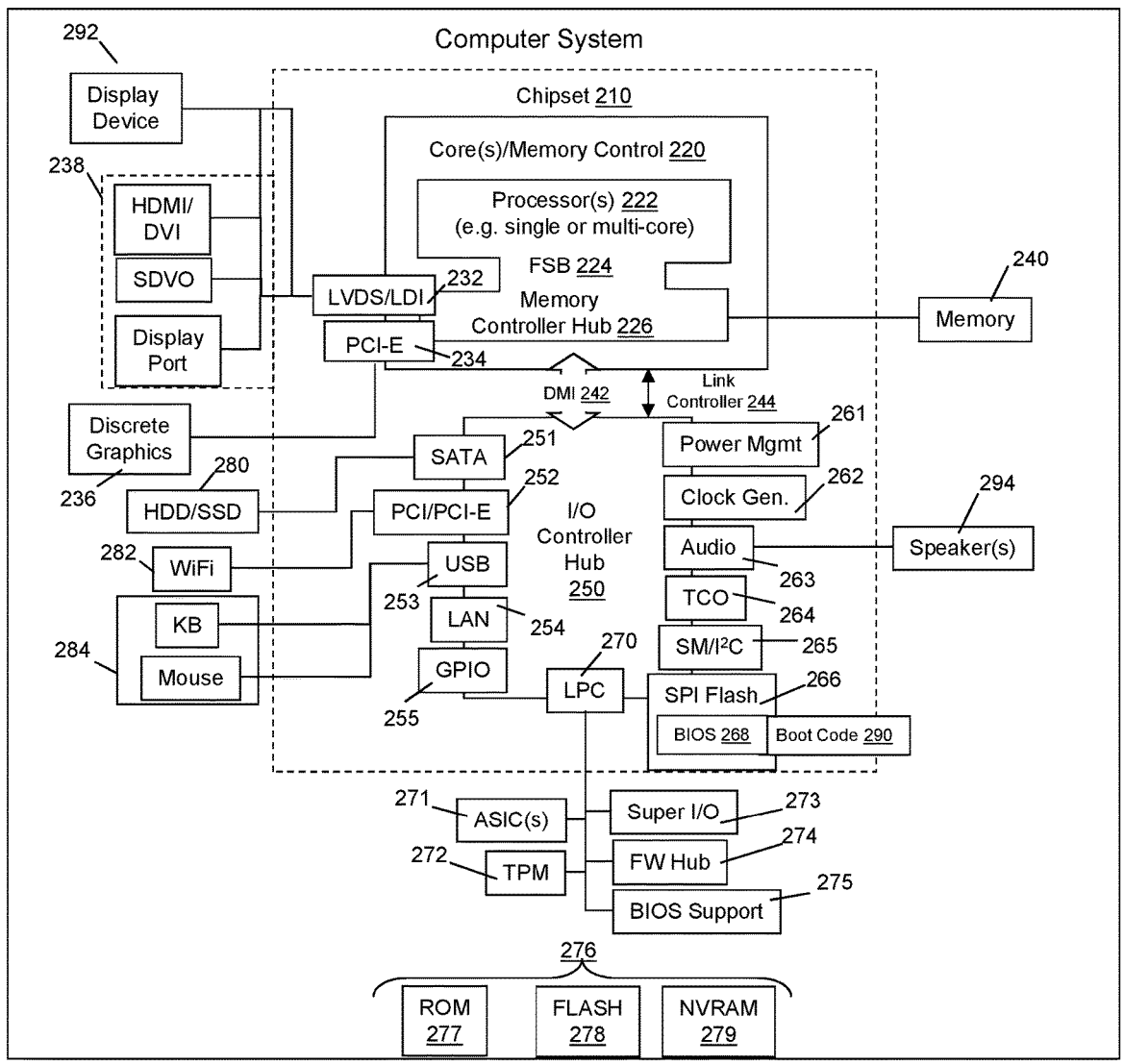
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that identifies from captured video image data, identifies a location of hands of the user in relation to a gesture zone and thereafter produces a framed video stream based upon the position of the user hands. For example, the circuitry outlined in FIG. 1 may be implemented in a tablet or smart phone embodiment, whereas the circuitry outlined in FIG. 2 may be implemented in a personal computer embodiment.

Figure 3:
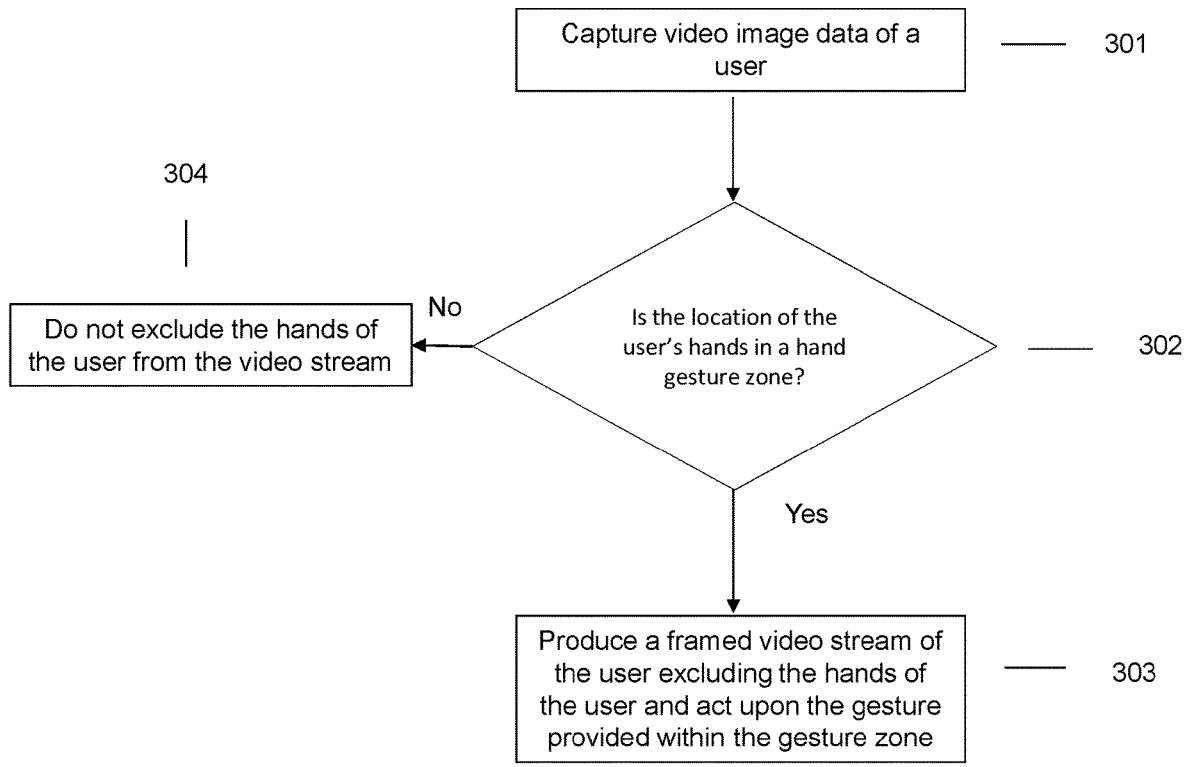
FIG. 3 illustrates an example method for producing a framed video and acting upon gestures provided by a user by use of a gesture detection system.

FIG. 3 illustrates an example method for producing a framed video and acting upon gestures provided by a user based upon the location of the user's hands in relation to an established gesture zone utilizing a gesture detection system. The method may be implemented on a system which includes a processor, memory device, output devices (e.g., display device, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the gesture detection system itself is specifically programmed to perform the functions as described herein to produce a framed video stream and act upon gestures provided by a user based upon a location of the hands of the user with respect to a gesture zone.

The gesture detection system may run in the background of an information handling device and may be activated when the device is activated. Additionally, or alternatively, the system may be activated when an application associated with sharing and/or recording a video stream (e.g., video conferencing application, social media application, multimedia processing program, etc.) is activated, detected, or otherwise opened. The system may also activate the system upon the capturing of video image data of a user. In this case, the gesture detection system may not be activated until video image data of a user is captured at an information handling device in use.

Once the gesture detection system is activated on a device, the system may be utilized throughout the process of identifying a location of the user's hands in relation to a gesture zone and producing a video stream of the user and act upon gestures provided by the user based upon the location of the hands in relation to the gesture zone. Continued use of the gesture detection system identifying the location of the user's hands within the captured video image data and producing the video of the user and acting upon gestures will train the device in producing an accurate framed video stream and accurately identifying when gestures should be acted upon. To perform the steps present in the gesture detection system and in order to accurately produce a framed video stream of the user and accurately identify when gestures should be acted upon, the gesture detection system may utilize a neural network, machine-learning model, and/or other learning algorithm, collectively referred to as a machine-learning model for ease of readability. The machine-learning model can be trained utilizing previously supplied video image data, identified hand locations, and identified gesture zones. In other words, the machine-learning model is given access to previously captured and obtained video image data streams and annotated hand locations and gesture zones. Additionally, the machine-learning model may receive previously produced framed video streams and information regarding the location of the user's hands in relation to the gesture zone to further train the machine-learning model. This historical and annotated information is referred to as a training dataset.

Using the training dataset, which may change over time, the machine-learning model learns nuances between hand locations and gesture zones. For example, the model may receive annotated information related to a location of the hands of the user and gesture zones and may thereafter learn locations of hand gestures zones. As another example, the model may receive video images that include annotated hand gestures and may thereafter learn gestures that are intended to control functions of the system and that should not be included in the video stream. As another example, the model may receive previously captured video and the resulting produced framed videos to learn when a user's hands should be framed out of the video.

As new framed videos are produced and gestures are acted upon, this information can be further ingested by the model, thereby allowing the machine-learning model to learn additional nuances and become more accurate and refined over time. Thus, while there is an initial training dataset that is used to initially train the machine-learning model, the machine-learning model is learning over time based upon new information received by the machine-learning model, thereby evolving to become more accurate. It should be noted that the subsequent learning is generally done automatically by the model, where the model automatically ingests predictions made by the model and any feedback, input, or changes the user makes to the predictions, in this case the predictions being the framed video, predictions made by the model to produce the framed video, and predictions made by the model to detect and act upon gestures.

At 301, the system may utilize at least one sensor coupled to an information handling device to capture video image data of the user. The at least one sensor may be either integrally coupled to the information handling device (e.g., smart phone, personal computer, laptop computer, tablet, computing system, smart television, a combination of devices, etc.) and/or may be operatively coupled to the information handling device. The at least one sensor may be a wide field of view image capturing device (e.g., a camera with a wide field of view, etc.). Additionally, or alternatively, the at least one sensor may be at least two image capture devices (e.g., two cameras located at different physical positions, two cameras capturing different camera angles, etc.). Utilizing at least two image capturing devices may include, for example, utilizing an image capturing device integrally coupled to an information handling device (e.g., front facing camera of a laptop, worldview camera of a portable device, camera of the wearable device, etc.), while additionally utilizing at least one image capturing sensor operatively coupled to the information handling device (e.g., a wireless camera, camera coupled to another device, etc.). Other sensors may be utilized, for example, heat sensors, infrared image sensors, light sensors, proximity sensors, and/or the like.

A wide field of view image capture device may collect additional image data within a scene containing a user as compared to a traditional image capturing device. A wide field of view (FOV) image capture device generally captures an image with a wider field of view as compared to a traditional FOV camera. The orientation of the wide FOV image capture device may be changed to capture more image information in different directions depending on how the user would like to set up the image capture environment. Similarly, the use of two or more image capture devices allows for the capture of image information additional to a single traditional FOV image capture device. The two or more image capture devices can be set up so that a wide field of view can be captured between the two or more image capture devices.

Figure 4:
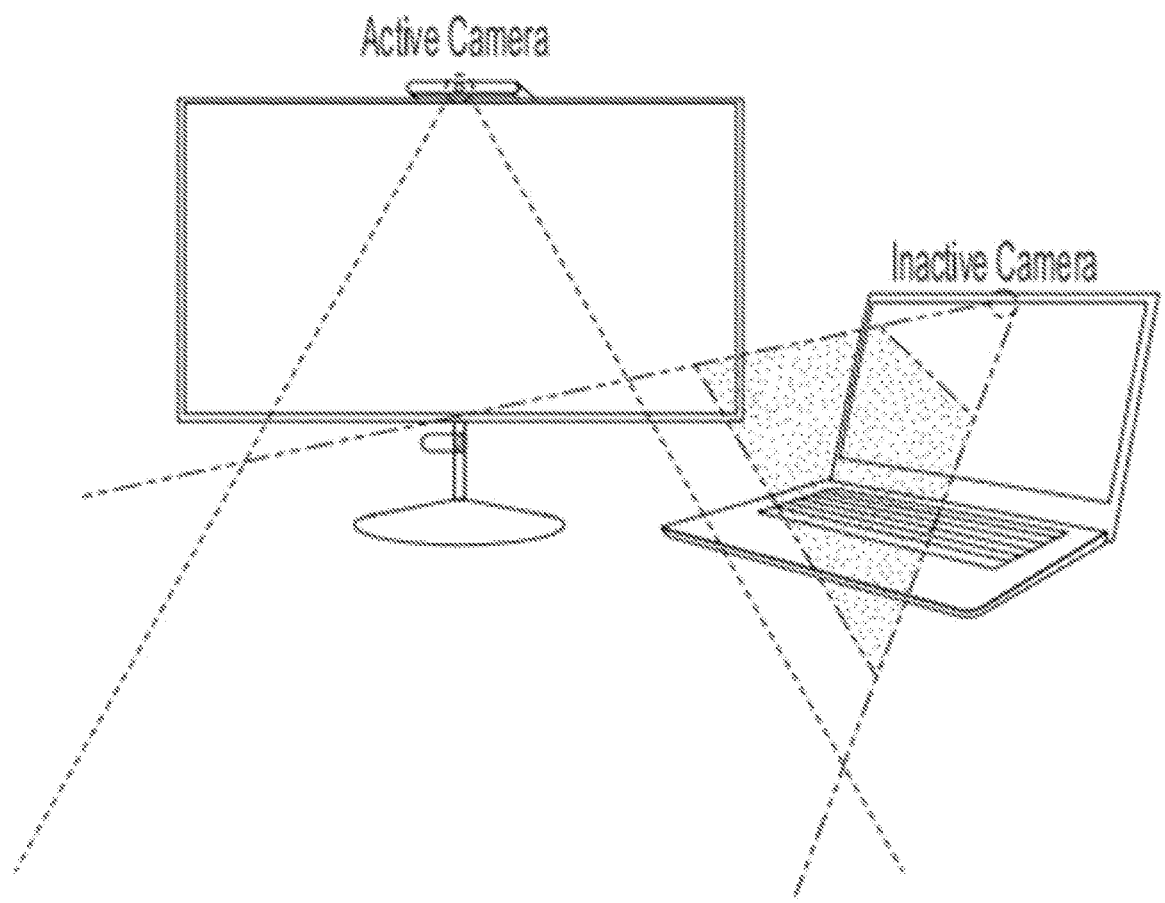
FIG. 4 illustrates an example multi-camera system set up to capture gesture control.

When utilizing two or more image capture devices to capture video image data, the system may assign in order of priority to each image capture device in use. For example, in a system that utilizes two image capture devices, as is illustrated in FIG. 4, one image capture device may be identified as the primary image capture device or active camera, while the additional image capture device may be a secondary, or inactive, image capture device. Active and inactive refer to whether the camera is capturing a video stream to be presented or that is being transmitted. Also, as illustrated in FIG. 4, the image capture devices may be set up so that a blind-spot is created. The blind-spot is the location where the primary and secondary image capture device fields of view do not overlap, illustrated as the gray shaded portion in FIG. 4. Assignment of the priority of the image capture devices may be predetermined by the user, a default setting, and/or the like. The system may utilize the collected video image data of a user within a scene to determine, at 302, if a location of the user's hand is present in a gesture zone.

When identifying if the location of the user's hand is in a gesture zone, at 302, the system must first establish the gesture zone. A gesture zone is a zone that is identified for the receipt of gestures that control functions of the system. For example, a user may provide a gesture within the gesture zone that will increase the volume of an audio output device, change a presentation camera, mute background noise, change a video background, advance a slide on a presentation, and/or the like. These gestures, while helpful in controlling functions within the computing system, are generally not desired to be included in a produced video stream. Thus, the gesture zone is established and those gestures provided within this zone are excluded from the produced video stream.

Initially, the gesture zone is a zone present in the captured video image data, meaning that the gesture zone and any gestures provided within the zone are captured using one or more of the image capture devices. This is generally necessary so that the system can actually respond to gesture commands from the user. In other words, the system needs to capture the gestures so that the desired function can be performed. By capturing the gesture with the image capture device(s) that is capturing the video image data to be included in the produced video stream means that a dedicated image capture device is not needed for each of the gesture capture and the video stream capture.

The gesture zone may be determined by the gesture detection system identifying an appropriate location for the gesture zone from the captured video image data. The gesture detection system may analyze the video image data, including historical video image data, and identify a location where the user normally or naturally provides gestures for controlling the system. This identification may be assisted using a machine-learning model. Generally, the gesture zone will be located in the field of view that is outside a normal field of view or on the outside edges of a normal field of view. In other words, in both the wide FOV and multiple image capture device setups, the captured field of view is larger than a traditional field of view single image capture device. Since the traditional field of view single image capture would normally be utilized to capture image data, the areas outside this area would be good candidates for the gesture zone. In other words, the area within the wide field of view that is outside a standard field of view is a good candidate for a gesture zone. Alternatively, or additionally, the outer edges of a traditional field of view and possibly in combination with the wider field of view area, would also be a good candidate for the gesture zone. In this case, the produced video can be cropped to remove the gesture zone or the standard field of view can be cropped to remove the gesture zone.

Another good candidate for the gesture zone may be a blind spot created by the use of multiple image capture devices. For example, in the illustration of FIG. 4, the gray-shaded area representing the blind spot where the inactive camera can capture video that is not also captured by the active camera. By utilizing the area that is captured by the inactive camera but not also captured by the active camera as a gesture zone, the active camera that is transmitting or producing the video stream will not inadvertently capture the gestures in the gesture zone. The gesture zone may also be identified or predetermined by the user, a default configurable location, multiple locations, and/or the like.

At 302, the gesture detection system may identify a location of the user's hands. Identifying a location of the hands of the user in relation to the gesture zone may be performed using image analysis techniques, movement identification techniques, tracking techniques, image comparison techniques, a combination thereof, and/or the like. Identifying the location of the hands of the user with respect to a gesture zone may also be performed based upon a comparison of image data collected by more than one image capture device. Image data captured by one device, but not another device may be automatically identified as a gesture. For example, if the inactive camera of FIG. 4 captures image data, but the active camera does not, the gesture detection system may automatically assign that image data as gesture data without performing an additional analysis of the image data with respect to framing the image data.

When the location of the user's hands are outside, or not within, the gesture zone, at 302, the system may include the hands of the user in a video stream. In this system, the framed video stream of the user with the user's hands present may include providing all the video image data captured, at 301. Even if the hands are not within the gesture zone, the system may still crop or frame the video stream. However, this cropping or framing may be irrespective of the location of the hands of the user, meaning the hands of the user may be included in the video stream as opposed to specifically excluded from the video frame when the hands are located within the gesture zone.

When the location of the user's hands are within the gesture zone, at 302, the system may produce a framed video stream of the user, at 303, removing the hands, and therefore, the gesture, from the framed video stream. To create the framed video stream, the system may utilize an auto-framing system that automatically detects the location of the user and frames the video stream around the user's head. The system may also use an extended auto-framing technique where the frame size created by the auto-framing technique is extended to include more of the user than conventional auto-framing techniques, but to exclude the gesture zone. Thus, instead of only creating a video having the user's head, the frame may also include the shoulders and more of the background of the user while excluding the gesture zone.

The system may also perform an additional action when the hands are within the gesture zone, specifically, the system may perform whatever function is associated with the gesture provided in the gesture zone. In other words, the system may provide instructions to perform an action or function based upon detection of the gesture within the gesture zone, thereby acting upon the gesture provided within the gesture zone. Thus, the video stream produced is framed respective to the location of the hands of the user. In other words, if the hands of the user are within the gesture zone, the video stream is framed to remove the hands of the user. If the hands of the user are outside the gesture zone, the video stream is framed irrespective of the location of the hands of the user, meaning the hands may or may not be included in the framed video stream.

The framed video stream may include a frame size smaller than a frame of the video image data captured so that a portion of the capture image data is excluded. Specifically, if the hands are in the gesture zone, the video stream is framed so that the hands are excluded from the video stream. It should be noted that other portions of the video may be excluded from the framed video. As mentioned previously, the framing may be assisted or accomplished using an auto-framing technique. Framing may also be performed by identifying a traditional FOV and excluding any image data outside the traditional FOV. Framing may also be performed by excluding any image data that is captured by an inactive, secondary, gesture, or other identified image capture device from the video stream.

Once the framed video stream is produced, the framed video stream may be transmitted to at least one participant remote from the user or presenter, for example, in a video conferencing set up. The framed video stream may also be transmitted, uploaded, or saved, for access by other users, for example, in a data storage location accessible by other users, in a data storage location associated with the Internet, to a social media site, as a saved video conference or presentation recording, and/or the like.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    establishing, utilizing a gesture detection system, a gesture zone for a user, wherein the gesture zone comprises an area captured by at least one image capture device that is outside a field of view that is utilized within a transmitted video of the user, wherein the at least one image capture device comprises a wide field of view image capture device that captures image data having a wider field of view as compared to the field of view and wherein the gesture zone is established within an area of the wider field of view and outside the field of view;
    capturing, utilizing the at least one image capture device coupled to an information handling device, video image data of a user, wherein the video image data comprises video image data within the area of the wider field of view and the field of view;
    identifying, utilizing the gesture detection system and within the video image data, a location of hands of the user in relation to the gesture zone; and
    performing, utilizing the gesture detection system and based upon the location of the hands of the user in relation to the gesture zone, an action.

2. The method of claim 1, wherein the performing an action comprises performing a function associated with a gesture performed within the gesture zone.

3. The method of claim 1, comprising establishing a gesture zone based upon a configuration of the at least one image capture device.

4. The method of claim 3, wherein the establishing comprises cropping the video image data.

5. The method of claim 1, wherein the gesture zone is defined by the user.

6. The method of claim 1, comprising transmitting a video stream to at least one participant remote from the user, wherein the video stream excludes the gesture zone.

7. The method of claim 6, wherein the video stream is generated utilizing an extended auto-framing technique to exclude the gesture zone.

8. A system, the system comprising:
    at least one image capture device;
    a processor operatively coupled to the at least one image capture device;
    a memory device that stores instructions that when executed by the processor, causes the system to:
    establish, utilizing a gesture detection system, a gesture zone for a user, wherein the gesture zone comprises an area captured by the at least one image capture device that is outside a field of view that is utilized within a transmitted video of the user, wherein the at least one image capture device comprises a wide field of view image capture device that captures image data having a wider field of view as compared to the field of view and wherein the gesture zone is established within an area of the wider field of view and outside the field of view,
    capture, utilizing the at least one image capture device, video image data of a user, wherein the video image data comprises video image data within the area of the wider field of view and the field of view;
    identify, utilizing a gesture detection system and within the video image data, a location of hands of the user in relation to the gesture zone; and
    perform, utilizing the gesture detection system and based upon the location of the hands of the user in relation to the gesture zone, an action.

9. The system of claim 8, wherein the performing an action comprises performing a function associated with a gesture performed within the gesture zone.

10. The system of claim 8, comprising establishing a gesture zone based upon a configuration of the at least one image capture device.

11. The system of claim 10, wherein the establishing comprises cropping the video image data.

12. The system of claim 8, wherein the gesture zone is defined by the user.

13. The system of claim 8, comprising transmitting a video stream to at least one participant remote from the user, wherein the video stream excludes the gesture zone.

14. A product, the product comprising:
    a computer-readable storage device that stores executable code that, when executed by the processor, causes the product to:
    establish, utilizing a gesture detection system, a gesture zone for a user, wherein the gesture zone comprises an area captured by at least one image capture device that is outside a field of view that is utilized within a transmitted video of the user, wherein the at least one image capture device comprises a wide field of view image capture device that captures image data having a wider field of view as compared to the field of view and wherein the gesture zone is established within an area of the wider field of view and outside the field of view;
    capture, utilizing the at least one image capture device coupled to an information handling device, video image data of a user, wherein the video image data comprises video image data within the area of the wider field of view and the field of view;
    identify, utilizing a gesture detection system and within the video image data, a location of hands of the user in relation to the gesture zone; and
    perform, utilizing the gesture detection system and based upon the location of the hands of the user in relation to the gesture zone, an action.

* * * * *